United States Patent [19]
Hazelton et al.

[11] Patent Number: 5,770,906
[45] Date of Patent: Jun. 23, 1998

[54] COMPACT ELECTRIC MOTOR CONSTRUCTION EMPLOYING FLUID BEARINGS

[75] Inventors: Mark Hazelton, Cornelius; Charles J. Cheever, Beaverton, both of Oreg.

[73] Assignee: SAE Magnetics (H.K.) Ltd., Portland, Oreg.

[21] Appl. No.: 490,067

[22] Filed: Jun. 13, 1995

[51] Int. Cl.$^6$ .............. F16C 17/10; F16C 33/72; H02K 7/08

[52] U.S. Cl. .............. 310/90; 310/67 R; 384/100; 384/107; 384/112; 384/121; 384/123; 384/132

[58] Field of Search ............... 310/67 R, 90; 384/107, 112, 121, 123, 124, 100, 114, 132

[56] References Cited

U.S. PATENT DOCUMENTS

| | | | |
|---|---|---|---|
| 4,445,793 | 5/1984 | Shinohara | 384/130 |
| 4,484,750 | 11/1984 | Scruggs | 277/9 |
| 5,112,142 | 5/1992 | Titcomb et al. | 384/107 |
| 5,142,173 | 8/1992 | Konno et al. | 310/67 R |
| 5,423,612 | 6/1995 | Zang et al. | 384/119 |
| 5,427,456 | 6/1995 | Hensel | 384/112 |
| 5,433,529 | 7/1995 | Hensel | 384/112 |
| 5,487,608 | 1/1996 | Leuthold et al. | 384/113 |
| 5,524,986 | 6/1996 | Leuthold et al. | 384/119 |
| 5,533,811 | 7/1996 | Polch et al. | 384/107 |
| 5,536,088 | 7/1996 | Cheever et al. | 384/107 |
| 5,558,443 | 9/1996 | Zang | 384/112 |
| 5,558,445 | 9/1996 | Chen et al. | 384/132 |

*Primary Examiner*—Steven L. Stephan
*Assistant Examiner*—Michael J. Wallace, Jr.
*Attorney, Agent, or Firm*—Chernoff, Vilhauer, McClung & Stenzel

[57] ABSTRACT

A compact electric motor construction employing fluid bearings for use in a disk drive apparatus includes a spindle having a shaft and a thrust plate and a hub assembly including a hub having an outer disk support portion with an inner thrust bearing surface located axially above the upper thrust bearing surface of the thrust plate. The hub also includes an inner sleeve which substantially surrounds the shaft and provides an air gap between its inner diameter and the outer diameter of the thrust plate. The air gap is vented to the interior of the motor cavity by vent passages. Transition grooves are provided on bearing surfaces adjacent all fluid seal zones for controlling the migration of bearing fluid in a radial direction and for providing a low fluid pressure region adjacent capillary seals at the ends of the shaft to contain the seal and prevent leakage.

10 Claims, 2 Drawing Sheets

COMPACT ELECTRIC MOTOR CONSTRUCTION EMPLOYING FLUID BEARINGS

BACKGROUND OF THE PRESENT INVENTION

The following invention relates to an electric motor primarily for use in disk drives and in particular relates to a compact motor construction employing fluid bearings.

Electric motors for disk drives employing fluid bearings are generally more desirable than motors having conventional ball bearings. With fluid bearings there is less wear as well as less noise and vibration resulting in longer life because there is no metal-to-metal contact. Furthermore, elimination of ball bearings enables the electric motor to be made more compactly.

Typically, electric motors employing fluid bearings include a pair of radial bearings and at least one axial thrust bearing. The radial bearing pair provides stiffness along the axis of the shaft and resists tilting moments. The axial bearing is created by a thrust plate, which may be integral with the shaft, and at least one axially opposed bearing surface. Typically, an integral shaft and thrust plate combination is surrounded by a hub having an inner sleeve which provides a lower axial bearing surface immediately beneath the thrust plate. This type of motor is usually sealed at the top by an end cap which is secured to the hub and also forms an upper axial bearing surface. An example of this type of construction is shown in co-pending patent application Ser. No. 08/284,812 entitled FLUID BEARING CONSTRUCTION EMPLOYING THRUST PLATE WITH PRESSURE COMPENSATION PORTS which issued as U.S. Pat. No. 5,433,529 to Hensel on Jul. 18, 1995, and assigned to the same assignee as the application herein. It is difficult with such designs to bond the end cap to the hub in a way that insures integrity of the joint. An adhesive must be used which makes a joint that is subject to both shock and thermal stress.

Most fluid bearings are sealed with a capillary seal that forms in a radial gap between the shaft and the hub end cap. An example of this type of seal is shown in U.S. Pat. No. 5,112,142 to Titcomb et al. and entitled HYDRODYNAMIC BEARING. Another example of this type of seal is shown in the aforementioned Hensel reference Alternatively, the seal may be formed internally in an air space occupied by the thrust plate which is surrounded by the hub and its attached end cap. An example of this type of construction is shown in Shinohara U.S. Pat. No. 4,445,793 entitled BEARING. In all of the aforementioned designs the fluid seal either forms an interface near the top of the motor shaft or is vented to the atmosphere through vents in the end cap. Fluid bearings must be vented to the atmosphere because of changes in atmospheric pressure which can effect the integrity of the seal.

In disk drive motors, the hub surrounding the motor shaft is typically located in a clean area. The hub typically has a flange that supports a magnetic disk and the upper end of the hub is usually designed to be inserted through an aperture in the magnetic disk such that the top of the motor shaft is in the clean area. Thus, for this type of design it is highly undesirable to have vents at the top of the shaft along the end cap because of the risk that leaking bearing fluid would contaminate the clean area and destroy the magnetic hard disk.

Seals for fluid bearings are created by capillary action of the fluid in the gap between two opposing surfaces. When assembling motors, however, it is necessary to place the bearing fluid on a first surface and then assemble the motor to provide the opposed bearing surface. Without the opposed bearing surface present during assembly, however, bearing fluid has a tendency to migrate across the first bearing surface. This makes such motors extremely difficult to manufacture. In addition, leakage can occur regardless of the bearings' geometry due to pressure changes. Such pressure changes can occur, for example, if the motor experiences changes in altitude due to use in an aircraft. The tendency of such pressure changes is to push the bearing fluid out of the seal zone because of the expansion of air trapped in the fluid. Once the surface tension seal is broken, the fluid escapes and the motor is ruined. The aforementioned vents help to control the effect of pressure differentials on the bearing fluid, but there always remains the possibility of fluid migration and a rupture of the seal.

A desirable object in motor design would be a compact motor employing fluid bearings of high integrity and a means for isolating the clean area of a disk drive from the effects of a possible leak.

SUMMARY OF THE INVENTION

The present invention provides a compact electric motor for use in disk drive applications with a high integrity fluid seal that will not leak or corrupt the clean space occupied by the magnetic hard disk. In addition, the motor has a low profile, is highly resistant to thermal stress, and is easier to manufacture because of fewer pieces requiring adhesive bonds.

According to one aspect of the invention, a compact electric motor construction employing fluid bearings for use in a disk drive apparatus includes a shaft having a spindle and a thrust plate where the spindle has a first outer diameter and a thrust plate has a second larger outer diameter. The thrust plate includes upper and lower thrust bearing surfaces. A hub assembly includes a hub having an outer disk support portion and an inner thrust bearing surface located axially above the upper thrust bearing surface of the thrust plate. The hub assembly further includes a sleeve adjoined to the hub and substantially surrounding the shaft. The sleeve includes an axial thrust bearing surface situated below he lower thrust bearing surface of the thrust plate. According to this construction, an integral hub thrust bearing surface is thus provided for the shaft thrust plate so that an end cap bonded by adhesive to the hub is not necessary. Furthermore, the hub having the inner thrust bearing surface is displaced from the clean environment in which the hub and the disk support portion are inserted.

The upper and lower thrust surfaces on the thrust plate portion of the shaft include a herringbone spiral groove pattern for creating a pumping action directed toward the center of the thrust surfaces. There is a gap between the outer diameter of the thrust plate along its outer cylindrical edge and the inner diameter of the sleeve portion. This gap is an air space not occupied by bearing fluid. Passageways are provided in the sleeve portion communicating this air gap with the interior of the hub, which is the area occupied by the stator coils. This interior region is exposed to outside atmospheric pressure, and these vents allow for the necessary expansion of the fluid seal zone without the potential risk of contamination in the clean area occupied by the magnetic hard disk.

In another aspect of the invention, disruptions or discontinuities in the bearing surfaces, both along the axial fluid bearing areas and the radial fluid bearing areas are provided to create low pressure regions which help maintain the integrity of the fluid bearing seals. A radial groove may be provided on the thrust plate itself or on the inner surface of the hub or sleeve above and below the thrust plate bearing surfaces. As fluid migrates towards the end of the seal zone it encounters these disruptions in the bearing surfaces which in turn tends to create a surface tension barrier preventing further migration of the bearing fluid. Transition grooves may also be provided in the shaft at each axial end thereof, near the fluid seal zone to create negative pressure regions to help contain fluid which might tend to be pushed out at either axial end of he bearing by hydrodynamic pressure.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
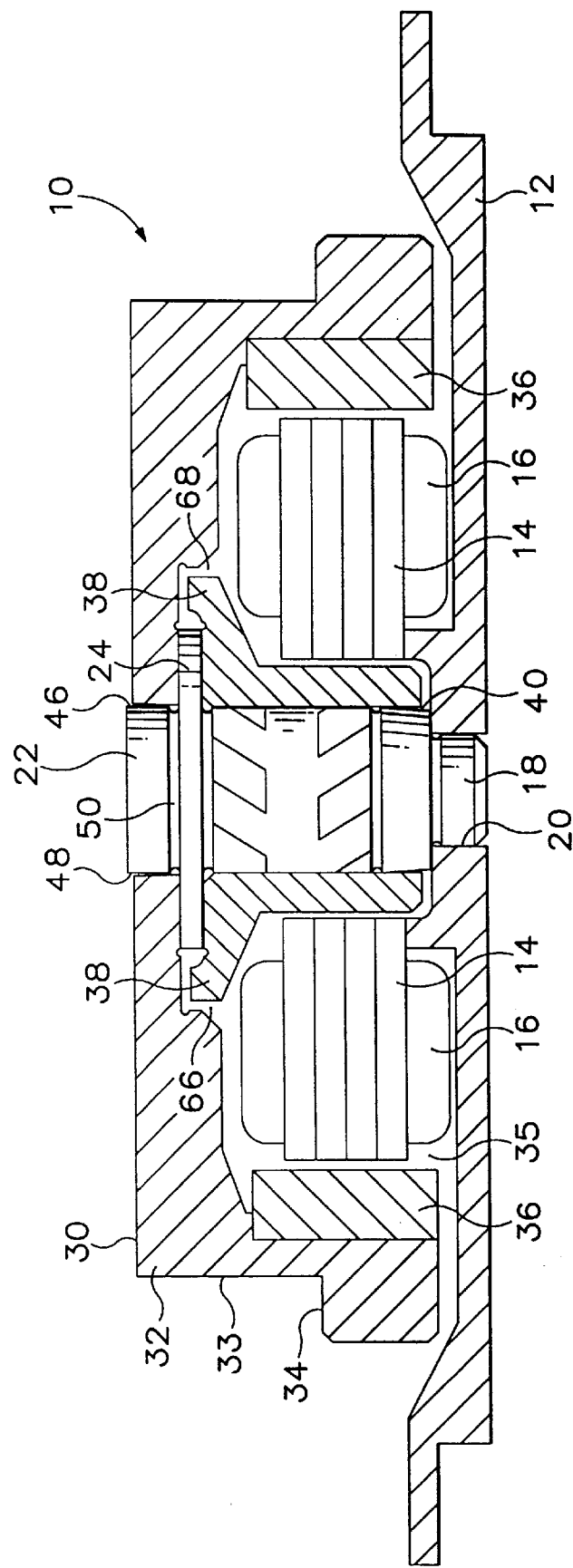
FIG. 1 is a side cutaway view of a compact electric motor employing the invention.

An electric motor 10 constructed according to the invention includes a mounting base 12 which supports a plurality of laminated stator plates 14. The stator plates 14 are wound with stator coils 16. The base 12 includes a fixed spindle 18 journalled into an aperture 20 in the base. The spindle 18 includes a vertical shaft 22 having a first outer diameter and a thin horizontal thrust plate 24 having a second larger outer diameter along a cylindrical edge thereof.

A hub assembly 30 includes a hub 32 having an outer disk support portion 33 which includes a flange 34. The outer disk support portion 33 of the hub assembly 30 is dimensioned to pass through the central opening of a magnetic storage disk or series of magnetic storage disks that are supported by the flange 34 within a "clean" environment, usually a sealed chamber inside a disk drive apparatus (not shown).

The interior portion of the hub defines an air space 35 occupied by the stator coils 16. The hub 30 is a rotary hub and is driven by the interaction of the stator coils 16 with magnets 36 which are affixed to the inside of the hub about the periphery of its inner diameter. The hub 30 includes an interior sleeve 38 which substantially surrounds the portion of the shaft below the thrust plate 24 and defines a radial gap between the shaft outer diameter and the inner diameter of the sleeve. An axial gap is also defined between the top of the sleeve and the bottom surface of the thrust plate.

Figure 2:
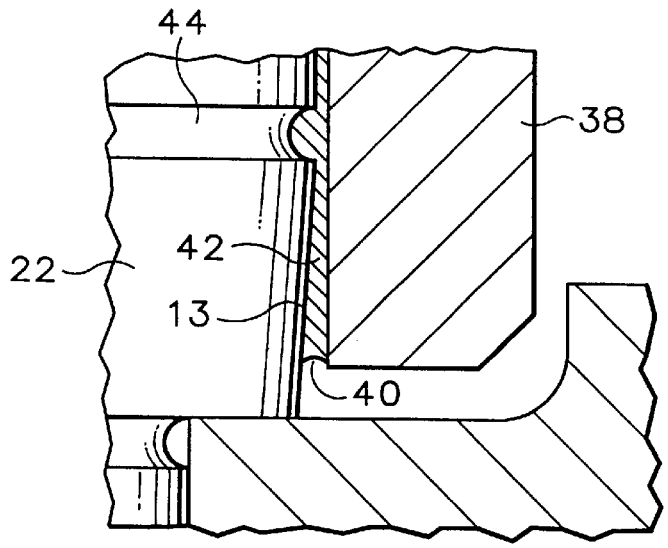
FIG. 2 is a close-up partial side cutaway view of the lower shaft fluid bearing seal of the motor of FIG. 1.

Referring to FIG. 2, the bottom of the inner sleeve portion 38 of the hub assembly 30 forms a gap with a tapered lower portion 13 of the shaft 12. This creates a lower seal zone 40 for bearing fluid 42 which is a lubricant that fills the radial gap between the shaft 22 and the sleeve 38. An annular transition groove 44 in the shaft 22 creates an area of low pressure immediately prior to the seal zone 40. Normally, bearing fluid will be contained in the area above the groove 44 due to the discontinuity in the shaft surface. To further preserve the integrity of the seal, the lower edge of the sleeve 38 may include a barrier film which serves to increase the surface tension of the bearing fluid at the outer edge of the seal zone 40.

A fluid seal zone 46 is also formed for bearing fluid which is deposited on the upper surface of the thrust plate 24 prior to assembly. Like the seal at the bottom, the shaft is tapered slightly to create diverging surfaces in the seal zone 46. Thus, a tapered gap exists between the top of the shaft and the inner diameter of an aperture 48 formed in the outer disk support portion of the hub 30. In addition, just below the seal zone 46 a transition groove 50 is cut into the shaft. This groove forms a disruption on the surface of the shaft which inhibits the migration of fluid and provides an area of low pressure. Normally, the fluid is contained along the horizontal thrust surface and does not enter the groove 50. This area of low pressure acts as a buffer or reservoir for bearing fluid if it does enter this area and compensates for changes in atmospheric pressure which might otherwise cause ultimate disruption of the seal 46 and leakage of the bearing fluid.

Figures 4, 4A, 4B:
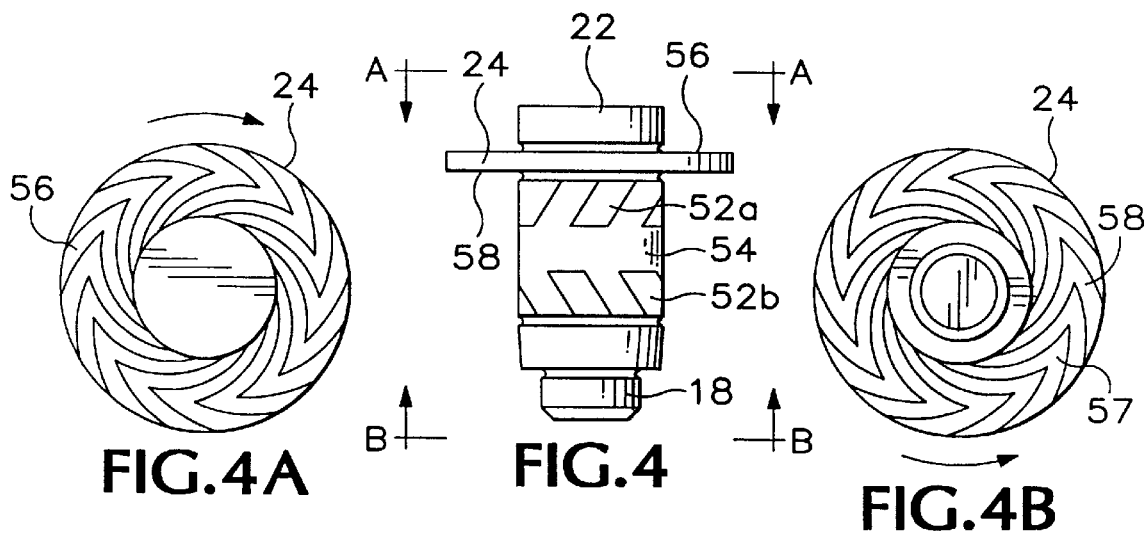
FIG. 4 is a side view of the shaft in the motor of FIG. 1.
FIG. 4A is a schematic illustration of the groove pattern on the top of the thrust plate taken along line A—A in FIG. 4.
FIG. 4B is a schematic illustration of the groove pattern on the bottom of the thrust plate taken along line B—B in FIG. 4.

Referring to FIG. 4 the shaft includes herringbone journalled grooves in an asymmetrical pattern. The upper grooves 52a are separated from the lower grooves 52b by a land portion 54. In actual operation the motor turns in a clockwise direction and the grooves create a hydrodynamic pressure that directs bearing fluid toward the center land portion 54 of the shaft 22. This helps to control the hydrodynamic pressure at the outer edges of the upper and lower shaft seal zones 46 and 40, and in addition creates a more uniform pressure distribution which helps to combat tilting moments.

Figure 3:
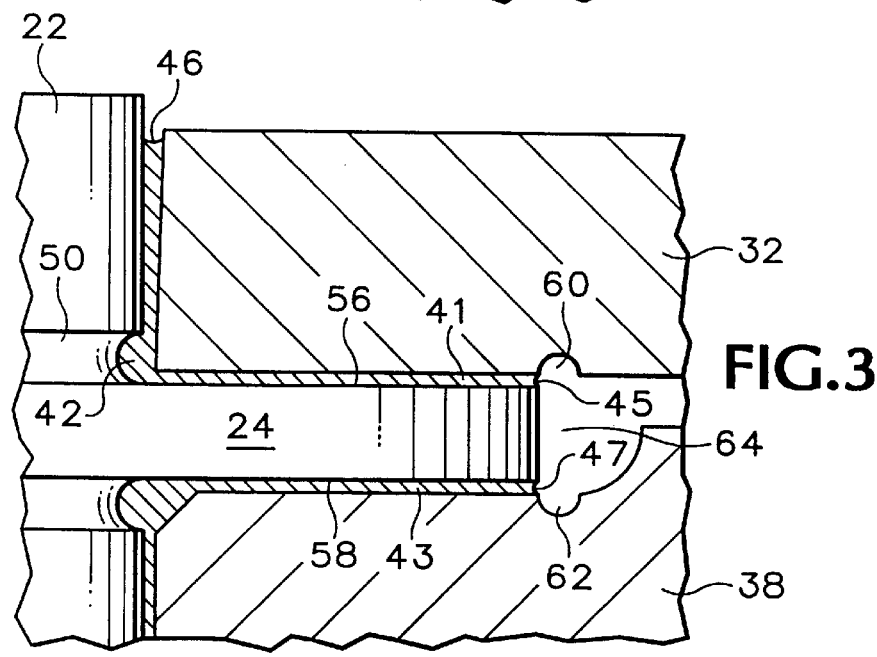
FIG. 3 is a close-up partial side cutaway view of the thrust plate and radially extending fluid bearing seals in the motor of FIG. 1.

Referring to FIGS. 3, 5 and 6, the thrust plate portion 24 of the spindle 18 includes an upper surface 56 and a lower surface 58. The upper surface 56 includes the groove pattern of FIG. 4A and the lower surface 58 has the groove pattern of FIG. 4B. The arrow indicates the direction of rotation of the hub 30 relative to the fixed shaft 22. Both the upper and lower groove patterns direct bearing fluid toward the middle 57 of the thrust plate 24 between the shaft and the thrust plate's outer diameter. This keeps the bearing fluid constrained in an axial gap 41 between the bottom inner surface of the hub's disk support portion 32 and the upper thrust plate bearing surface 56, and in an axial gap 43 between the bottom surface 58 of the thrust plate and the upper axial surface of the inner sleeve 38. Thus, thrust bearing zones 45 and 47 are defined between the inside of the hub and the top of the thrust plate and the inside of the sleeve and the bottom of the thrust plate.

Because bearing fluid tends to migrate across a flat surface, transition grooves 60 and 62 are cut into the inside of the hub assembly disk support portion 32 near the outer diameter of the thrust plate 24 and in the inner sleeve portion 38 of the hub assembly 30, again, near the thrust plate's outer diameter. Both of these grooves would normally be in the air gap 64 between the sleeve inner diameter and the thrust plate outer diameter where the vent holes are. The surface disruptions in both of these locations enhance the strength of the capillary seal and prevents the bearing fluid from migrating into the air gap 64 where vent passages 66 and 68 are located. The passages 66 and 68 vent the air gap 64 into the motor cavity 35, away from the clean area occupied by the outer hub disk support surface 33. The grooves form sharp angles on their respective bearing surfaces near the outer diameter of the thrust plate. When the bearing fluid 42 encounters this sharp discontinuity near the edge of the thrust plate outer diameter, surface tension increases and holds the bearing fluid within the seal zones 45 and 47.

The invention is illustrated using upper and lower transition grooves near the outer diameter of the thrust plate, but in actual practice only one such groove, either in the hub assembly disk support portion, or in the inner sleeve portion may be necessary. Additionally, while the invention is shown with two vent holes venting the air gap 64 to the interior motor cavity, more, or even fewer, vent passages may be provided if necessary. There should usually be an even number of vent passages, however, to provide proper balance for the motor. The upper and lower capillary seals are illustrated with a taper on the shaft. It should be appreciated that either surface may be tapered to create a capillary seal. Parallel surfaces may also be used if the gap is narrow enough.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a fluid bearing having a rotary member and a stationary member, said members having respective bearing surfaces separated by a gap containing bearing fluid, at least one of said surfaces having a tapered end portion to form a fluid seal zone thereby creating a fluid seal by capillary action, the improvement comprising at least one of said surfaces having a transition groove between said members and annularly adjacent the fluid seal zone to create an area of low pressure for maintaining the integrity of the fluid seal.

2. The improvement of claim 1 wherein said rotary member and said stationary member have first and second end portions and first and second fluid seal zones, said fluid seal zones being located near said end portions and each of said fluid seal zones having a transition groove in at least one of the surfaces.

3. The improvement of claim 1 wherein said rotary member is a rotary hub having an inner sleeve and said stationary member is a shaft, said sleeve substantially surrounding said shaft and separated by said gap.

4. The improvement of claim 3 wherein said transition groove is located in said shaft.

5. A compact electric motor construction employing fluid bearings for use in a disk drive apparatus comprising:
    (a) a spindle including a shaft with an annular, perpendicular integral thrust plate, the shaft having a first outer diameter and the thrust plate having a second, larger outer thrust plate diameter; and
    (b) a hub assembly having an outer disk support portion and an inner sleeve portion, the inner sleeve portion surrounding a substantial portion of the shaft and having an inner sleeve diameter larger than said outer thrust plate diameter of said thrust plate portion;
    (c) said thrust plate located between said sleeve portion and said outer disk support portion, said inner sleeve diameter extending beyond said outer thrust plate diameter thereby defining an air gap between said sleeve portion, said outer disk support portion, and said outer thrust plate diameter;
    (d) said sleeve portion defining at least a pair of passages venting said air gap to ambient atmospheric pressure.

6. The compact electric motor construction of claim 5 wherein said pair of passages communicates between said air gap and an air space on the inside of said hub assembly.

7. A compact electric motor construction employing fluid bearings for use in a disk drive apparatus comprising:
    (a) a spindle including a shaft with an annular, perpendicular integral thrust plate, the shaft having a first outer diameter and the thrust plate having a second, larger outer diameter, the thrust plate including upper and lower thrust bearing surfaces;
    (b) a hub assembly including a hub portion having an outer disk support portion integral with an inner thrust bearing surface, said outer disk support portion on the external annular periphery of said hub portion, said inner thrust bearing surface located axially above the upper thrust bearing surface of said thrust plate; and
    (c) said hub assembly further including a sleeve portion surrounding said a substantial portion of said shaft, said sleeve portion including an axial thrust bearing surface situated below the lower thrust bearing surface of said thrust plate;
    (d) wherein the thrust plate includes an outer diameter and an outer radial cylindrical edge and wherein said sleeve portion includes an inner diameter radially displaced from said outer radial cylindrical edge, said inner diameter being larger than said thrust plate outer diameter thereby forming a radial gap, said gap being normally free of bearing fluid, and wherein said sleeve portion includes a plurality of vent passages communicating between said gap and ambient atmosphere.

8. The compact electric motor construction of claim 7 further including a stator portion wherein said hub is substantially enclosed by said hub assembly to create a motor cavity, and wherein said vent passages extend from said radial gap into said motor cavity.

9. A compact electric motor construction employing fluid bearings for use in a disk drive apparatus comprising:
    (a) a spindle including a shaft with an annular, perpendicular integral thrust plate, the shaft having a first outer diameter and the thrust plate having a second, larger outer diameter, the thrust plate including upper and lower thrust bearing surfaces;
    (b) a hub assembly including a hub portion having an outer disk support portion integral with an inner thrust bearing surface, said outer disk support portion on the external annular periphery of said hub portion, said inner thrust bearing surface located axially above the upper thrust bearing surface of said thrust plate; and
    (c) said hub assembly further including a sleeve portion surrounding said a substantial portion of said shaft, said sleeve portion including an axial thrust bearing surface situated below the lower thrust bearing surface of said thrust plate;
    (d) wherein said hub assembly further includes at least one radical transition groove located near an outer radical edge of said thrust plate.

10. The compact electric motor construction of claim 9 wherein said sleeve portion and said outer disk support portion each include a radial transition groove.

* * * * *